Sept. 9, 1958   L. H. BUZZINI   2,850,829
HOLDER AND PULL-OUT FOR A COLLAPSIBLE FISH NET UNIT
Filed Feb. 13, 1956
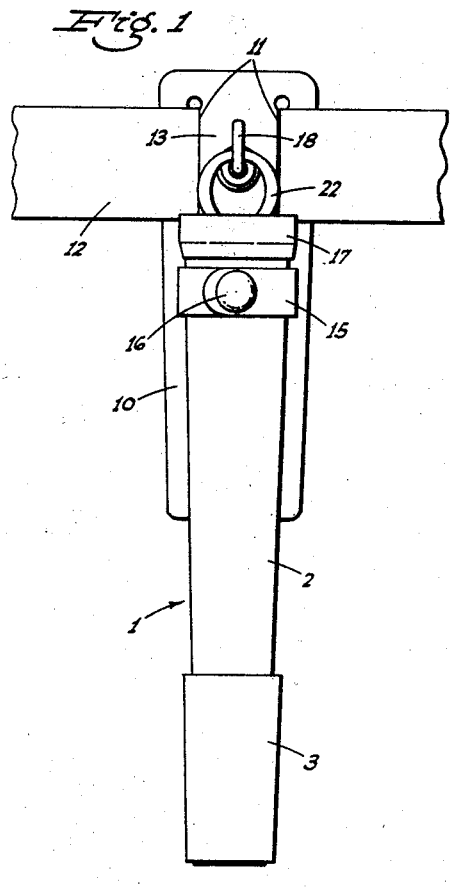
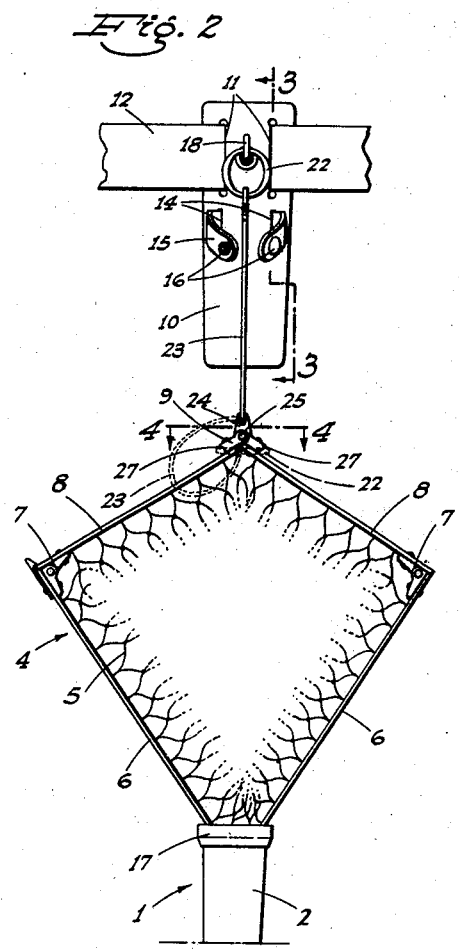
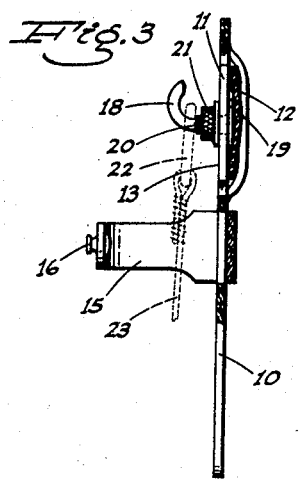
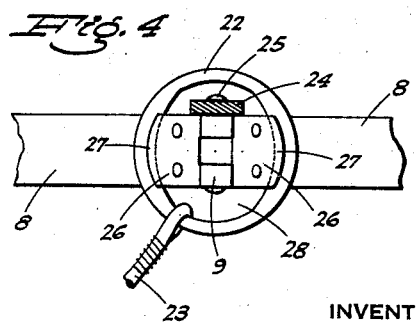
INVENTOR
Lee H. Buzzini
BY Webster & Webster
ATTYS.

United States Patent Office 2,850,829
Patented Sept. 9, 1958

2,850,829
HOLDER AND PULL-OUT FOR A COLLAPSIBLE FISH NET UNIT

Lee H. Buzzini, Yosemite National Park, Calif.

Application February 13, 1956, Serial No. 564,898

3 Claims. (Cl. 43—12)

The present invention is directed to, and it is a major object to provide, a novel device whose purpose is to serve as a holder and pull-out for a collapsible fish net unit of the type which is normally folded for convenient carrying in a compact assembly, but—by means of a pull—is quick-unfolded or opened for use; a fish net unit of this character being illustrated in my United States Letters Patent No. 2,738,608, dated March 20, 1956.

Another important object of this invention is to provide a device, as above, which includes a holder—preferably belt supported—on which the fish net unit is normally and quick-detachably secured, and depends at the fisherman's side; there being novel pull means releasably connected between the holder and said fish net unit operative to cause automatic unfolding or opening thereof when grasped and pulled away from said holder. With such arrangement the collapsed fish net unit can be carried by a fisherman without annoying interference with walking, or fishing activities, yet be within easy reach for ready opening for use.

An additional object of the invention is to provide a device, as in the preceding paragraph, wherein such pull means includes a cord extending between the holder and fish net unit; there being a hook on the holder, and the corresponding end of the cord being fitted with a ring releasably engaging the hook; the cord—upon the fish net unit being grasped and pulled away from the holder—imposing a force on said unit in a direction to cause the latter to automatically unfold to open position. Thereafter, with an upward movement or lifting of the fish net unit, accompanied by a slight shake or flip, the ring flies off the hook and the net is ready for use.

A further object of this invention is to provide a holder and pull-out, for a collapsible fish net unit, which can be manipulated by one hand of the fisherman, so that the other hand remains free for holding the rod and playing a fish while the net unit is being unfolded to open position and readied for use.

It is also an object of the invention to provide a holder and pull-out, for a collapsible fish net unit, which is designed for ease and economy of manufacture.

Still another object of the invention is to provide a practical and reliable holder and pull-out, for a collapsible fish net unit, which will be exceedingly effective for the purpose for which it is designed.

These objects are accomplished by means of such structure and relative arrangement of parts as will fully appear by a perusal of the following specification and claims.

In the drawings:

Fig. 1 is an elevation of the device as belt-supported; the fish net unit being shown in its carrying position, with the ring engaging the hook.

Fig. 2 is a similar view, on reduced scale, but shows the fish net unit as unfolded and open for use.

Fig. 3 is an enlarged transverse sectional elevation on line 3—3 of Fig. 2.

Fig. 4 is an enlarged sectional plan view on line 4—4 of Fig. 2.

Referring now more particularly to the drawings, and to the characters of reference marked thereon, the numeral 1 indicates generally a normally collapsed or folded fish net unit; such unit being of the type shown in my above identified patent, and includes a tubular handle 2 fitted with a hand grip 3 at the rear end and being open at the front end.

A collapsible frame, indicated generally at 4, carries the net 5, and such frame 4 is normally folded and—together with the net 5—is contained within the tubular handle 2.

The collapsible frame 4—which is shown in its unfolded or open position in Fig. 2—includes opposed, outwardly divergent side strips 6 hinged at their outer ends, as at 7, to the inner ends of opposed, inwardly convergent outer end strips 8. The outer end strips 8 are hinged together at their adjacent ends—i. e. centrally of the front of the frame 4—by means of another hinge 9.

Initially, or when the frame 4 is collapsed, the strips 8 are folded in against the corresponding strips 6, and all lie in substantial parallelism within the confines of the tubular handle 2.

The novel holder and pull-out for the fish net unit 1 comprises a vertically elongated flat apron 10 of leather or the like; such apron—at its upper end portion—having transversely spaced vertical slits 11 therethrough so that the apron may be suspended from a fisherman's trouser belt 12 by threading such belt through the slits 11 and behind the web 13 between such slits.

A short distance below the position occupied by the belt 12, the apron 10 is formed with other transversely spaced, vertical slits 14 through which a retention strap 15 passes; the forward end portions of said retention strap—which is preferably elastic—projecting from the face of the apron. Such forward end portions of the retention strap are fitted at their ends with a two-part button type snap 16.

When in its carrying position the fish net unit 1 is disposed with the upper portion of the handle 2 lying against the apron 10, and the upper end of said handle—which is defined by an enlarged collar 17—disposed immediately below the web 13. In this position of the handle 2, the projecting portions of the retention strap 15 encircle the handle 2 immediately below the collar 17, and the snap 16 is coupled so as to normally but releasably hold the fish net unit 1 in a position of suspension from the apron 10 and at the side of the fisherman.

An upwardly opening hook 18 is attached to, and projects outwardly from, the web 13; such hook having an enlarged head 19 on the inner end of its shank 20, and which head abuts the back of the web 13. From the head 19 the shank 20 of the hook passes through the web 13, and a knurled nut 21 is threaded on such shank and bears against the front of said web.

A ring 22 is normally engaged on the hook 18, and a pull cord 23, of predetermined length, is connected between such ring 22 and the central or outer end hinge 9 of the frame 4 which is normally collapsed and telescoped into the tubular handle 2. At this time the ring 22 occupies a position at the upper end of said handle 2, and the pull cord 23 is disposed within said handle along with the collapsed frame 4. The inner end of the pull cord 23 is attached to the hinge 9 by an ear 24 carried on one end of the hinge pin 25.

When it is desired to use the fish net unit 1, the fisherman—with one hand—disengages the snap 16 and then grasps the handle 3 and pulls such fish net unit 1 away from the apron 10.

With such motion of the fish net unit 1 the pull cord 23 is tensioned and causes withdrawal of the frame 4 from within the handle 2, and upon such withdrawal said frame 4 automatically snaps open to its unfolded position (see Fig. 2).

Thereafter, the fisherman—with the same hand—raises the handle 2 and shakes or flips it to detach the ring 22 from the hook 18, which frees the fish net unit 1 entirely from the holder, and so that said unit is then ready for use to net a fish.

Under certain circumstances it may be desired that the frame 4 of the fish net unit 1 be locked in its open position; i. e. against accidental folding. This is accomplished in the following manner:

The hinge 9 includes oppositely extending hinge leaves 26 secured to the adjacent portions of the outer end strips 8, and said leaves include—at their outer ends—lips 27 which overhang said strips 8 in spaced relation thereto. The ring 22 is formed with a substantially oval-shaped opening 28 dimensioned so that in one position of the ring it may be passed downwardly beyond the lips 27 and into engagement with the strips 8. Thereafter, with a quarter-turn of the ring 22 it effectively locks under the lips 27 and thus prevents infolding of the hinge 9. With the hinge 9 so locked against infolding the frame 4 cannot be collapsed.

With the foregoing holder and pull-out for a fish net unit of the type described, the unit is carried conveniently and for ready manual access; such fish net unit—when it is desired for use—being easily unfolded to open position by the simple one-hand manipulations hereinbefore described.

While the device has been described as preferably trouser belt supported, it is to be recognized that such device could, if desired, be suitably attached to a garment, such as the coat of the fisherman, or can be secured to the fisherman's creel; all while retaining the essential and advantageous features of the device.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In a collapsible fish net unit which includes an initially folded net frame adapted to be unfolded to an open position by a pull thereon, the frame comprising a plurality of frame strips and means connecting the strips together and including a hinge connecting adjacent strips at adjacent ends; a cord connected at one end to the frame unit adjacent the hinge, opposed lips on the hinge overhanging and spaced from the corresponding frame strips, and a rigid ring on the other end of the cord, the ring defining a non-circular opening arranged so that in one rotative position the ring can pass over the hinge from outwardly thereof and if then rotated to another position the ring will be engaged between said lips and strips to lock the hinge.

2. The combination of a pull-out device and a collapsible fish net unit comprising a normally folded net frame adapted to unfold to open position by a pull thereon; said pull-out device comprising a relatively stationary hook adjacent which the fish net unit is normally disposed, a pull cord between the hook and frame arranged to unfold said frame when said pull unit is drawn away from the stationary hook, a ring on the hook end of the cord removably engaged on the hook, the frame of the fish net unit including a plurality of frame strips, a hinge pivotally connecting adjacent ends of certain frame strips, the hinge being exposed when the frame is unfolded, opposed lips on the hinge overhanging corresponding frame strips, and the ring having a non-circular opening therein arranged so that in one rotative position the ring can pass over said hinge from outwardly thereof and thereafter be part-rotated to another position with the ring then engaged between said lips and strips to lock the hinge.

3. A holder and pull-out for a collapsible fish net unit which includes a tubular handle, and a net frame normally folded and disposed within the handle but adapted to be withdrawn from one end thereof to then unfold to open position by a pull applied at a predetermined point on the frame; the holder comprising a member adapted to be supported on a fisherman adjacent his waist, a cord connected at its lower end to the net frame at said point thereon, a ring on the upper end of the cord, a hook mounted on the member to engage and removably support the ring, a handle-embracing strap unit mounted on the member below the hook and arranged to quick-detachably engage the handle adjacent its upper end, the cord being slack when the net frame is folded into the handle and the latter is engaged by said strap, and an enlarged collar on the upper end of the handle overhanging the strap unit to prevent downward movement of the handle through said strap unit.

References Cited in the file of this patent

UNITED STATES PATENTS

| | | |
|---|---|---|
| 385,015 | Smith | June 26, 1888 |
| 525,619 | Pearsons | Sept. 4, 1894 |
| 549,368 | Keenan | Nov. 5, 1895 |
| 1,088,766 | Borgardt | Mar. 3, 1914 |
| 1,203,471 | Boomhover | Oct. 31, 1916 |
| 1,617,600 | Kirsch | Feb. 15, 1927 |
| 2,578,237 | Geistweit | Dec. 11, 1951 |
| 2,738,608 | Buzzini | Mar. 20, 1956 |